3,827,987
REFORMING PROCESS
Ralph V. Green, Charleston, W. Va., assignor to E. I. du Pont de Nemours and Company, Wilmington, Del.
No Drawing. Filed Mar. 24, 1971, Ser. No. 127,845
Int. Cl. C01b 2/00
U.S. Cl. 252—373          2 Claims

ABSTRACT OF THE DISCLOSURE

In the manufacture of ammonia or hydrogen, natural gas is reformed with steam over a nickel catalyst in the tubes of a reformer to produce hydrogen and carbon monoxide. If hydrogen is added to the steam-natural gas mixture fed to the reformer, catalyst, catalyst tube life, and plant utility will be improved.

BACKGROUND OF THE INVENTION

Nitrogen in various chemical combinations is an essential constituent of most fertilizers. Although an abundant supply of atmospheric nitrogen is readily available, it must be converted into a "fixed" form suitable for use as a fertilizer. The principal source of fixed nitrogen used in the manufacture of fertilizers is ammonia.

The principal industrial process developed for the production of ammonia, involves the reaction of hydrogen from petroleum products, e.g., natural gas, with atmospheric nitrogen to form ammonia.

The major steps involved in this process are gas preparation, carbon monoxide conversion, gas purification, and ammonia synthesis.

In the typical ammonia plant natural gas is converted to ammonia synthesis gas by the steam reforming process using primary and secondary reformers.

In the primary reforming process, desulfurized natural gas at pressures of 250 to 600 p.s.i.g. is preheated up to about 520° C., mixed with superheated steam and passed through a nickel-base catalyst. The catalyst is contained in tubes heated externally to about 850° C. in the primary reformer.

Within the primary reformer tubes the following reactions occur between the natural gas and steam:

$$CH_4 + H_2O \rightleftharpoons CO + 3H_2$$

$$CH_4 + 2H_2O \rightleftharpoons CO_2 + 4H_2$$

These reactions are endothermic and require the application of a considerable amount of heat. An exothermic reaction also occurs in the reformer:

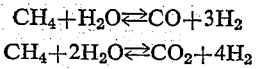
$$CO + H_2O \rightleftharpoons CO_2 + H_2$$

The effluent from the primary reformers consists of hydrogen, carbon monoxide, carbon dioxide, excess steam and unconverted methane. This effluent is fed to a secondary reformer for further reforming and then to other units such as the shift converters, scrubber, methanator, compressor and synthesis converter to produce ammonia.

A similar reforming process is used for hydrogen production.

In the reforming process, the catalyst tubes within the primary reformer are heated by a natural gas flame. The heat thus produced is conducted through the metal tubes and adsorbed by the reaction taking place as the steam and natural gas pass down and over the catalyst. As the reaction adsorbs the heat, the tubes are cooled and appear "black."

However, often after operation for a period of time a problem often occurs which has been labeled "hot spots" by those in the industry. This problem is manifested by cherry red hot spots appearing on the tubes indicating an increase in temperature. These hot spots increase in temperature until the life of the tubes is shortened seriously, and the primary reformer must be shut down to change the catalyst or steam the catalyst to restore the activity.

SUMMARY OF THE INVENTION

I have discovered that the continuous addition at 0.5 to 10% by volume, based on the natural gas, of hydrogen to the steam-natural gas mixture fed to the reformer will cause the "hot spots" to not form or to disappear. If the catalyst within the tube remains active, the wall will remain cool. However if the catalyst becomes inactive, the temperature of the catalyst tube and the furnace wall will become about equal and the hot spots will form.

It is believed that the active nickel catalyst is inactivated during the reforming reaction by being oxidized to nickel oxide. The hydrogen added to the feed mixture will react with the nickel oxide in the catalyst and reduce it to nickel, the active form of the catalyst. The catalyst is then sufficiently active to cause the endothermic reaction to take place and cool the tubes. Improved tube and catalyst life is then obtained.

DESCRIPTION OF THE INVENTION

In the conventional ammonia or hydrogen plant, hydrocarbon feed material and steam are reformed in a primary reformer to produce hydrogen and carbon oxides. The process of the invention is essentially the same conventional process with the addition of hydrogen to the high pressure reformer inlet to avoid "hot spots." No change in the conventional steam to carbon ratio or other operating conditions is required. Thus, the reforming can be conducted at temperatures from 650°–1,000° C., usually about 850° C. and at pressures of 250 to 600 p.s.i.g.

In the conventional primary reformer there is catalytically active nickel located in tubes which are located internally in a furnace. Since this nickel catalyst is susceptible to poisoning by sulfur compounds, means are used to remove sulfur from the natural gas feed stock. The means include the use of beds of activated carbon, molecular sieves, and zinc oxide to remove hydrogen sulfide and/or other types of sulfur compounds.

The steam and desulfurized natural gases, i.e., primarily methane, fed to the primary reformer are preheated to about 520° C. and are fed into the reformer at a pressure of 250 to 600 p.s.i.g. Within the reformer the feed mixture passes downward through tubes containing the nickel catalysts, i.e., usually nickel supported on alumina catalysts. However, the particular catalyst used is not critical and any form of nickel reforming catalyst is useful in the process of the invention.

The key to the process of the invention resides in the continuous addition at 0.5 to 10%, preferably 0.75 to 3.0% by volume, based on the natural gas, of hydrogen to the reformer feed. This continuous addition of hydrogen keeps the nickel catalyst in its active state by the following reaction:

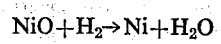
$$NiO + H_2 \rightarrow Ni + H_2O$$

With the catalyst in its active state, the external heat applied to the tubes is adsorbed by the reaction and "hot spots" do not form.

The addition of hydrogen may also provide an additional benefit by reducing the instances of sulfur poisoning of the catalyst by the reaction:

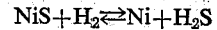
$$NiS + H_2 \rightleftharpoons Ni + H_2S$$

The presence of hydrogen in the feed will also promote the hydrogenation of olefins which otherwise would decompose readily to form carbon which in turn blinds the catalyst and covers the active centers.

$$H_2 + RCH=CH_2 \rightarrow RCH_2CH_3$$

Unreduced nickel promotes the formation of carbon from the methane by the following reaction $$CH_4 \rightarrow C + 2H_2$$

The presence of $H_2$ will reduce the tendency for this reaction to proceed.

The source of the hydrogen is not critical as long as the hydrogen feed does not contain other ingredients which would hinder the reforming process, e.g., it should be free of ammonia and low in nitrogen as these materials can be harmful to the catalyst tubes. The preferred source is purified $H_2$ (90–98% pure), however other hydrogen containing gases, e.g., gases from hydrogenation processes and methanol manufacture could be used.

The hydrogen added to the feed should be at a pressure between 250 and 600 p.s.i.g., preferably 50 p.s.i. above the reformer pressure.

It has also been found beneficial to add hydrogen to the reformer feed at start-up before adding the methane feed. This insures that the nickel catalyst is in its most active state during reforming. When hydrogen is added, the catalyst is activated at 500° C., while if not added, temperatures of about 700° C. are usually necessary.

When a high pressure reformer is started-up, conventionally steam is first fed into the reformer to bring the catalyst up to operating temperature without over heating the tubes. When the operating temperature is reached, the natural gas feed is slowly started.

I have found that if 1 to 5% by volume, based on the steam of hydrogen is added to the steam, the above improved results are obtained. More than 5% hydrogen can be used, however it is not necessary and would be wasteful.

The hydrogen feed would normally be started once the catalyst has been heated up to about 200° C. The time for this initial hydrogen feed is not critical, and will usually depend upon the time required to bring the reformer and other downstream equipment up to operating temperature.

The process of the invention is exemplified by the following example.

A desulfurized natural gas feed (95% methane) is heated to 1500° F. and at a pressure of 450 p.s.i.g. This feed is mixed with steam at 450° F. and 450 p.s.i.g., the mol ratio of steam to carbon being 3.7. The feed rate of the mixture is 22 mols/hr./ft.$^3$ of catalyst.

To this mixture is added 1% by volume, based on the natural gas, of purified hydrogen at 500 p.s.i.g.

The mixture is then fed into a primary reformer and poised over a nickel catalyst wherein reforming takes place. The operation continues without the formation of hot spots on the reformer tubes.

It is understood also that the process of the invention applies to the manufacture of hydrogen for use in the petroleum industry. In this process, natural gas is reformed in similar type equipment to produce a hydrogen, carbon monoxide mixture which is further processed to give 90–99% $H_2$.

I claim:

1. In the process for making hydrogen and carbon monoxide by feeding natural gas and steam over a nickel catalyst in a reformer at temperatures of 650° to 1000° C. and pressures of 250 to 600 p.s.i.g., the improvement comprising continuously feeding 0.5 to 10% by volume, based on the natural gas, of hydrogen with the natural gas-steam feed to the reformer.

2. The process of Claim 1, wherein the amount of hydrogen ranges from 0.75 to 3.0% by volume.

References Cited

UNITED STATES PATENTS

| Patent No. | Date | Inventor | Class |
|---|---|---|---|
| 3,459,520 | 8/1969 | Percival | 218—213 X |
| 1,711,036 | 4/1929 | Beekley | 252—373 X |
| 3,019,096 | 1/1962 | Milbourne | 48—213 |
| 3,469,957 | 9/1969 | Percival et al. | 48—214 |
| 2,683,152 | 7/1954 | Dickinson | 252—373 |
| 3,475,160 | 10/1969 | Heinzelmann et al. | 252—373 X |
| 2,284,603 | 5/1942 | Belchetz et al. | 252—373 X |
| 2,622,089 | 12/1952 | Mayland | 252—373 |
| 3,271,325 | 9/1966 | Davies et al. | 252—373 UX |
| 3,334,055 | 8/1967 | Dowden et al. | 252—472 X |
| 3,417,029 | 12/1968 | McMahon | 252—466 J |
| 3,507,811 | 4/1970 | Davies et al. | 252—466 J |
| 3,451,949 | 6/1969 | Topsoe | 252—455 |
| 3,476,536 | 11/1969 | McMahon et al. | 252—466 J |
| 3,418,093 | 12/1968 | Davies | 252—466 J |

HOWARD T. MARS, Primary Examiner